US007451642B2

(12) United States Patent
Hara et al.

(10) Patent No.: US 7,451,642 B2

(45) Date of Patent: Nov. 18, 2008

(54) SYSTEM AND METHOD FOR QUANTITATIVE ANALYSIS OF CAUSE OF TIRE TROUBLE

(75) Inventors: Yuki Hara, Tokyo (JP); Takashi Kikuchi, Tokyo (JP); Junichi Kase, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 97 days.

(21) Appl. No.: 11/662,663

(22) PCT Filed: Sep. 12, 2005

(86) PCT No.: PCT/JP2005/016765

§ 371 (c)(1), (2), (4) Date: Mar. 13, 2007

(87) PCT Pub. No.: WO2006/030740

PCT Pub. Date: Mar. 23, 2006

(65) Prior Publication Data

US 2008/0115572 A1 May 22, 2008

(30) Foreign Application Priority Data

Sep. 14, 2004 (JP) ............................. 2004-267054
Sep. 14, 2004 (JP) ............................. 2004-267064

(51) Int. Cl.
*G01M 17/02* (2006.01)

(52) U.S. Cl. ........................................................ 73/146

(58) Field of Classification Search ......... 73/146–146.8
See application file for complete search history.

(56) References Cited

U.S. PATENT DOCUMENTS 5,736,939 A 4/1998 Corcoran
5,847,645 A 12/1998 Boesch
2003/0006893 A1 1/2003 Dunbridge et al.

FOREIGN PATENT DOCUMENTS

DE 10340053 A1 * 3/2005
JP 2003-54229 A 2/2003
JP 2003-162665 A 6/2003
JP 2003-237337 A 8/2003
JP 2004-175349 A 6/2004

* cited by examiner

*Primary Examiner*—Andre J. Allen
*Assistant Examiner*—Jermaine Jenkins
(74) *Attorney, Agent, or Firm*—Sughrue Mion, PLLC

(57) ABSTRACT

There is provided a system and method for quantitative analysis of a cause of tire trouble capable of quantitatively analyzing whether the tire trouble is caused by the tire itself or in a matter of harshness of a tire using condition in light of not only a force acting on a tire mounted on a running vehicle but also harshness of a tire using condition such as a traveling speed of the vehicle, level difference of a road surface, a curve and gradient information. The method for quantitative analysis of a cause of tire trouble according to the present invention is characterized by comprising the steps of receiving positional data of a running vehicle from the GPS, simultaneously measuring triaxial accelerations which are accelerations acting on the running vehicle in back-and-forward, right-and-left and up-and-down directions while time synchronizing with the received data, quantitatively analyzing harshness of a tire using condition from the received positional data and the triaxial acceleration data, and displaying an analysis result.

15 Claims, 8 Drawing Sheets

(a)

(b)

(a)

(b)

SYSTEM AND METHOD FOR QUANTITATIVE ANALYSIS OF CAUSE OF TIRE TROUBLE

TECHNICAL FIELD

The present invention relates to a system and method for quantitative analysis of a cause of tire trouble capable of quantitatively analyzing whether the tire trouble is caused by the tire itself or in a matter of harshness of a tire using condition in light of not only a force acting on a tire mounted on a running vehicle but also harshness of a tire using condition such as a traveling speed of the vehicle, level difference of a road surface, a curve and gradient information.

RELATED ART

Conventionally, if a tire mounted on a vehicle has a trouble but the cause of the trouble is unidentified, there is no means for determining whether the trouble is caused by the tire itself or not the tire itself but a tire using condition.

As a cause of the trouble of the tire, a case where force acting on the tire exceeds an appropriate range may be recited by way of example. A method of measuring force acting on the tire as acceleration with an accelerometer mounting on the running vehicle is useful means for measuring the force acting on the tire.

The conventional method of measuring acceleration, however, encompass a various factors of the tire using conditions such as level difference of a road surface, curve and gradient, so that the factors are difficult to be separated from each other. Accordingly, when the tire using condition is involved in the cause of the tire trouble, it is difficult to identity the cause of the tire trouble.

In addition, the conventional method of measuring acceleration also has a problem that analogue data has to be loaded in a storage media and then amplified by an amplifier or analogue data has to be converted into digital data, otherwise a quantitative analysis cannot be conducted.

Further, as a method of measuring acceleration of a running vehicle in light of a tire using condition such as positional data and a traveling distance of the running vehicle, for example, Patent Document 1 discloses a method of measuring a tire using condition such as positional data and a traveling distance of a running vehicle by using GPS (Global Positioning System) with synchronizing a measurement of acceleration of the running vehicle.

The method disclosed in Patent Document 1, however, is not for detecting a tire trouble, but a method of determining a road surface condition which determining slipperiness from the road surface condition.

Patent Document 1: Japanese Patent Application Laid-open No. 2004-175349

DISCLOSURE OF THE INVENTION

Problems to be Solved by the Invention

It is an object of the present invention to provide a system and method for quantitative analysis of a cause of tire trouble capable of quantitatively analyzing whether the tire trouble is caused by the tire itself or in a matter of harshness of a tire using condition in light of not only a force acting on a tire mounted on a running vehicle but also harshness of a tire using condition such as a traveling speed of the vehicle, level difference of a road surface, a curve and gradient information.

Means for Solving the Problem

In order to achieve the above-mentioned object, a quantitative analysis system according to the present invention is characterized by comprising a positional data receiving means for receiving positional data of a running vehicle from the GPS, an acceleration measuring means for measuring triaxial accelerations which are accelerations acting on the running vehicle in back-and-forward, right-and-left and up-and-down directions while time synchronizing with the positional data received by the positional data receiving means, a database portion for storing the positional data received by the positional information receiving means and the triaxial acceleration data measured by the acceleration measuring means, a data analyzing means for quantitatively analyzing harshness of a tire using condition, and a display means for displaying an analysis result from the data analyzing means.

Preferably, the positional data is either planar positional data in light of a horizontal plane or stereoscopic positional data in light of both horizontal and vertical directions.

Further, the data analysis means calculates a traveling speed of the vehicle, level difference of a road surface and gradient information from the stereoscopic positional data, and/or calculates a frequent distribution of acceleration in an arbitrarily selected traveling block of the vehicle from the obtained triaxial acceleration data.

Moreover, it is further preferred that the quantitative analysis system has a player function capable of displaying the data wanted to be displayed among the obtained data with arbitrarily selecting a desired traveling block from all of the traveling track of the vehicle.

A quantitative analysis method according to the present invention is characterized by comprising a positional data receiving means for receiving positional data of a running vehicle from the GPS, an acceleration measuring means for measuring triaxial accelerations which are accelerations acting on the running vehicle in back-and-forward, right-and-left and up-and-down directions while time synchronizing with the positional data received by the positional data receiving means, a database portion for storing the positional data received by the positional information receiving means and the triaxial acceleration data measured by the acceleration measuring means, a data analyzing means for quantitatively analyzing harshness of a tire using condition, and a display means for displaying an analysis result from the data analyzing means.

Preferably, the positional data is either planar positional data in light of a horizontal plane or stereoscopic positional data in light of both horizontal and vertical directions.

Further, the data analysis means calculates a traveling speed of the vehicle, level difference of a road surface and gradient information from the stereoscopic positional data, and/or calculates a frequent distribution of acceleration in an arbitrarily selected traveling block of the vehicle from the obtained triaxial acceleration data;

Moreover, it is further preferred that the quantitative analysis system has a player function capable of displaying the data wanted to be displayed among the obtained data with arbitrarily selecting a desired traveling block from all of the traveling track of the vehicle.

It is preferred that the harshness of the tire using condition is quantitatively analyzed by using a value obtained by summing tendencies of causing a trouble in a bead portion and a trouble in a belt portion.

The tendency of causing a trouble in a bead portion is preferably calculated from values of a ratio of loading force acting on the tire, acceleration in the up-and-down and back-and-force directions, and gradient of the road surface.

The tendency of causing a trouble in a tread portion is preferably calculated from values of a heat factor of the tire and acceleration in the lateral direction acting on the tire.

Effect of the Invention

The quantitative analysis system and method of the present invention can quantitatively analyze whether tire trouble is caused by the tire itself or by harshness of a tire using condition in light of not only a force acting on a tire mounted on a running vehicle but also harshness of a tire using condition such as a traveling speed of the vehicle, level difference of a road surface, a curve and gradient information.

The quantitative analysis system and method of the present invention can also quantitatively analyze tire trouble such as input force acting on the tire which seriously affects the tire trouble by running the vehicle under a tire using condition which is actually applied or is desired to be applied in the future by a user. The present invention, thus, has such an effect that a tire having a configuration tolerant of harshness of the tire using condition can be developed on the basis of the result of the quantitative analysis, so that a tire suitable for the tire using condition which is actually applied by a user can be provided to the user.

BRIEF DESCRIPTION OF THE DRAWINGS

FIG. 7(*b*) is a graph visualizing only the data of one round trip of interest (first one round trip) out of the data of the three round trips shown in FIG. 7(*b*).

FIG. 8(*b*) is a graph visualizing only the data of one round trip of interest (first one round trip) out of the data of the three round trips shown in FIG. 8(*a*).

FIG. 9(*a*) shows a track in the specific block in which the distribution of the frequencies is calculated. FIGS. 9(*b*) and 9(*a*) have an abscissa axis representing the lateral acceleration (G) and an ordinate axis representing the frequencies in the specific block, and FIG. 9(*b*) shows a case where the acceleration (G) of the vehicle in the right-and-left direction is processed as an absolute value, and FIG. 9(*c*) shows a case where the acceleration (G) of the vehicle in the right-and-left direction is separately processed.

BEST MODE FOR CARRYING OUT THE INVENTION

Figure 1:
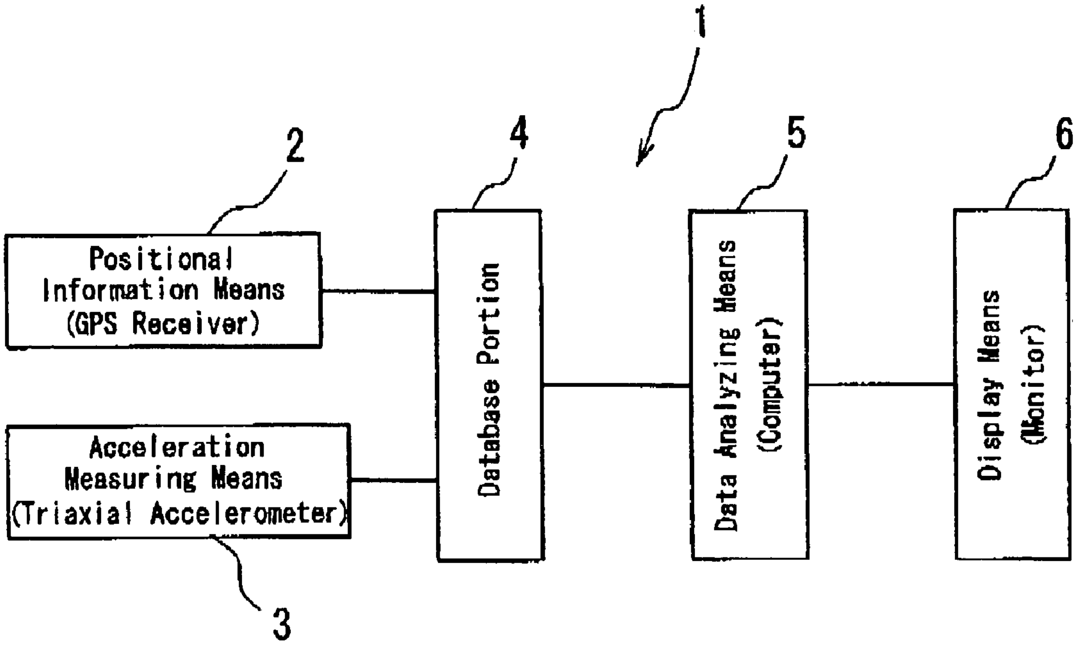
FIG. 1 is a flow chart of a representative quantitative analysis system for embodying the quantitative analysis method according to the present invention.

Hereinafter, illustrative examples of the present invention will be discussed.

A quantitative analysis system 1 for embodying a method for quantitative analysis of a cause of tire trouble according to the present invention is mainly composed of a positional data receiving means 2, an acceleration measuring means 3, a database portion 4, a data analyzing means 5 and a display means 6.

Figure 2:
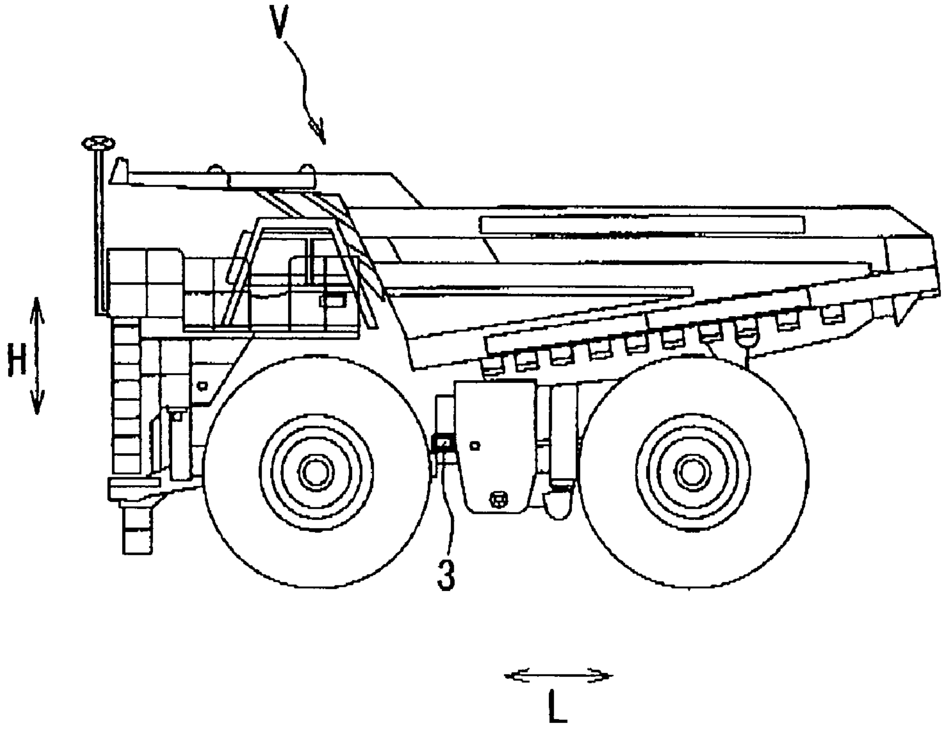
FIG. 2 is a side view of a construction vehicle equipped with the quantitative analysis system for embodying the quantitative analysis method according to the present invention.
Figure 3:
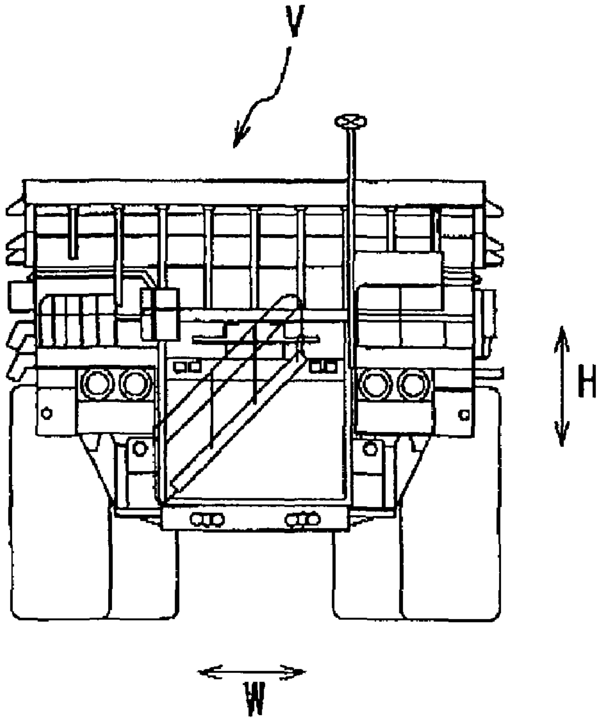
FIG. 3 is a front view of the construction vehicle shown in FIG. 2.
Figure 4:
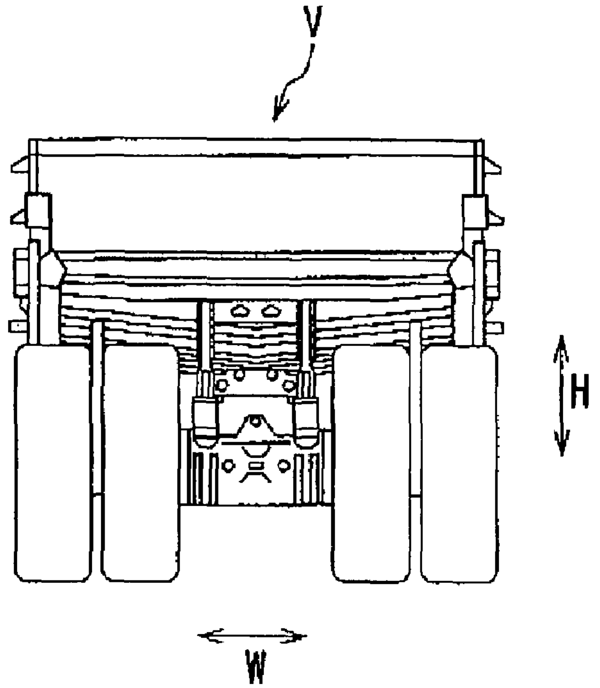
FIG. 4 is a back view of the construction vehicle shown in FIG. 2.

The positional data receiving means 2 is intended to be mounted on a vehicle V and to receive a positional data of the running vehicle from OPS (Global Positioning System). Specific example thereof may be a GPS receiver equipped with an integrated antenna. In terms of a mounting position on the vehicle, the antenna may be mounted on the front portion of the vehicle as shown in FIGS. 2 and 3.

The positional data obtained from the GPS may be only a planar positional data taking account of a horizontal plane, i.e. a plane including a back-and-force direction L and a right-and-left direction W with assuming the vehicle is located on a flat road surface without gradient. But a stereoscopic positional data taking account of, in addition to the positional data of the horizontal plane, positional data in a vertical direction H, i.e. altitude is more preferred in the point that other useful data (information) such as a traveling speed of the vehicle, a level difference of the road surface and gradient can be calculated.

The acceleration measuring means 3 is for measuring triaxial accelerations acting on the running vehicle in the back-and-forward direction, the right-and-left direction and the up-and-down directions with time synchronizing with the positional data received by the positional data receiving means 2. Specifically, a triaxial accelerometer capable of simultaneously measuring triaxial accelerations may be recited by way of example and a mounting position thereof on the vehicle is preferably, for example, a position where the triaxial accelerations acting on the tire can be measured with high accuracy, and more specifically, a position where a suspension of the vehicle exerts a cushioning action, i.e. an unsprung weight position. It is noted that FIG. 2 shows an example in which a triaxial accelerometer is mounted at a position near the left front tire at which force (load) acting on the tire is most harsh among front/read right/left tires under the front this running condition, but the present invention is limited to this configuration and the triaxial accelerometer may be mounted at a position near another tire or four triaxial accelerometer may be arranged. In the latter case, they are arranged at positions near the front/rear right/left tires and preferably inside of the vehicle with respect to the arranged positions of the tires.

The database portion 4 is for storing the positional data received by the positional information receiving means 2 and the triaxial acceleration data measured by the acceleration measuring means 3.

The data analyzing means 5 is for processing the positional data and the triaxial acceleration data stored in the database portion 4 and quantitatively analyzing harshness of the tire using condition. As the data analyzing means, a computer such as a PC (Personal Computer) may be recited by way of example.

The display means 6 is for displaying an analytical result from the data analyzing means and a monitor such as a CRT may be recited by way of example.

The data analyzing means 5 may calculate useful data (information) such as a traveling speed of the vehicle, level difference of the road surface and gradient information when the positional data obtained from the positional data receiving means 2 is stereoscopic positional data.

In addition, triaxial acceleration data obtained at every predetermined cycle (for example, one second) may be stored in the database portion 4 at each hierarchical section (for example, 0.01 G). This enables to plot the number of the acceleration data stored in each hierarchical section by using the data analyzing means 5 afterward. Thus, the distribution of frequencies of the acceleration in an arbitrarily selected traveling block of the vehicle may be calculated.

The quantitative analysis system 1 of the present invention is preferably configured to have a player function capable of displaying the data wanted to be displayed among the obtained data with arbitrarily selecting a desired traveling block from all of the traveling track of the vehicle.

Further, the quantitative analysis system 1 of the present invention is preferably configured to have a player function capable of displaying data of interest arbitrarily selected from the entire traveling track of the vehicle in the desired traveling block of the vehicle.

Next, discussed will be an example of a method of quantitatively analyzing the cause of tire trouble by means of the quantitative analysis system 1 having the above-mentioned configuration.

In order to investigate the cause of a trouble of a tire mounted on a vehicle such as the construction vehicle V, the user actually uses (drives) the vehicle to move the construction vehicle to the place (for example, a mining site) where the tire trouble occurs.

At this time, the positional data of the construction vehicle V from the GPS is received by the GPS receiver 2 mounted on the vehicle V, and the actual track of the running construction vehicle V is identified. The data (information) obtained from the GPS receiver 2 is, for example, measurement date, time difference, measurement time, latitude, longitude, altitude, data quality, speed, check sum and the like.

The triaxial accelerations acting on the running vehicle V in the back-and-forward, right-and-left and up-and-down directions are measured in time synchronism with the positional data received by the GPS receiver 2. The data (information) obtained by the triaxial accelerometer is, for example, measurement date, time difference, measurement time, acceleration value in x-axis, acceleration value in y-axis, acceleration value in z-axis, check sum and the like.

Then, the positional data received by the GPS receiver 2 and the triaxial acceleration data measured by the acceleration measuring means at every predetermined cycle (for example, one second) are stored in the data base portion 4.

Thereafter, the positional data and the triaxial acceleration data stored in the database portion 4 are utilized to quantitatively analyze the harshness of the tire using condition on a portable note-type PC 5, and the results can be displayed on a monitor 6 which is integrated with the PC 5 in a graph form or the like. It is noted that this example adopts the configuration in which the note-type PC 5 having the database portion 4, the data analyzing means 5 and the displaying means 6 is mounted on the vehicle V so that the analysis may be processed immediately after the running or it may be processed afterward with removing the note-type PC5 from the vehicle V at another place. The present invention, however, is not limited to this configuration and it is possible to mount a transmitter on the vehicle V so that the positional data and the triaxial acceleration data may be received and analyzed at a remote place.

Figure 5:
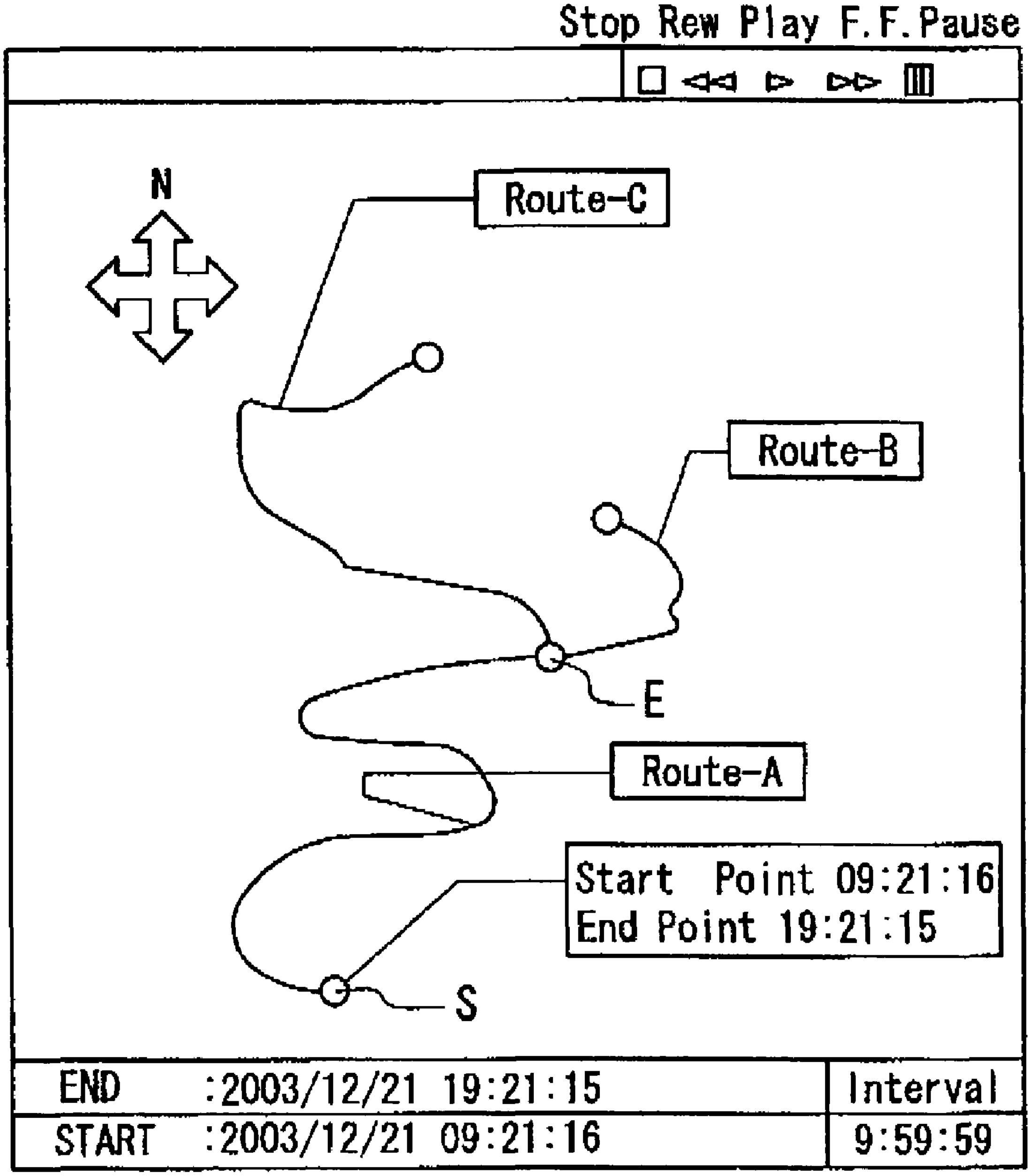
FIG. 5 shows displayed planar tracks on a monitor which are measured for three routes A, B and C of the running construction vehicle V by a GPS receiver 2 mounted on the construction vehicle.

FIG. 5 shows planar tracks which are measured for three routes A, B and C of the running construction vehicle V by the GPS receiver 2 mounted on the construction vehicle. The lower section of the display in FIG. 5 indicates that the data was corrected from 9:21:16 to 19:21:15 on Dec. 21, 2003, i.e. for 9 hours 59 minutes 59 seconds, and the upper section of the display in FIG. 5 indicates that a player function capable of arbitrary selecting and displaying the data in a desired running block of the vehicle is provided.

Figure 6:
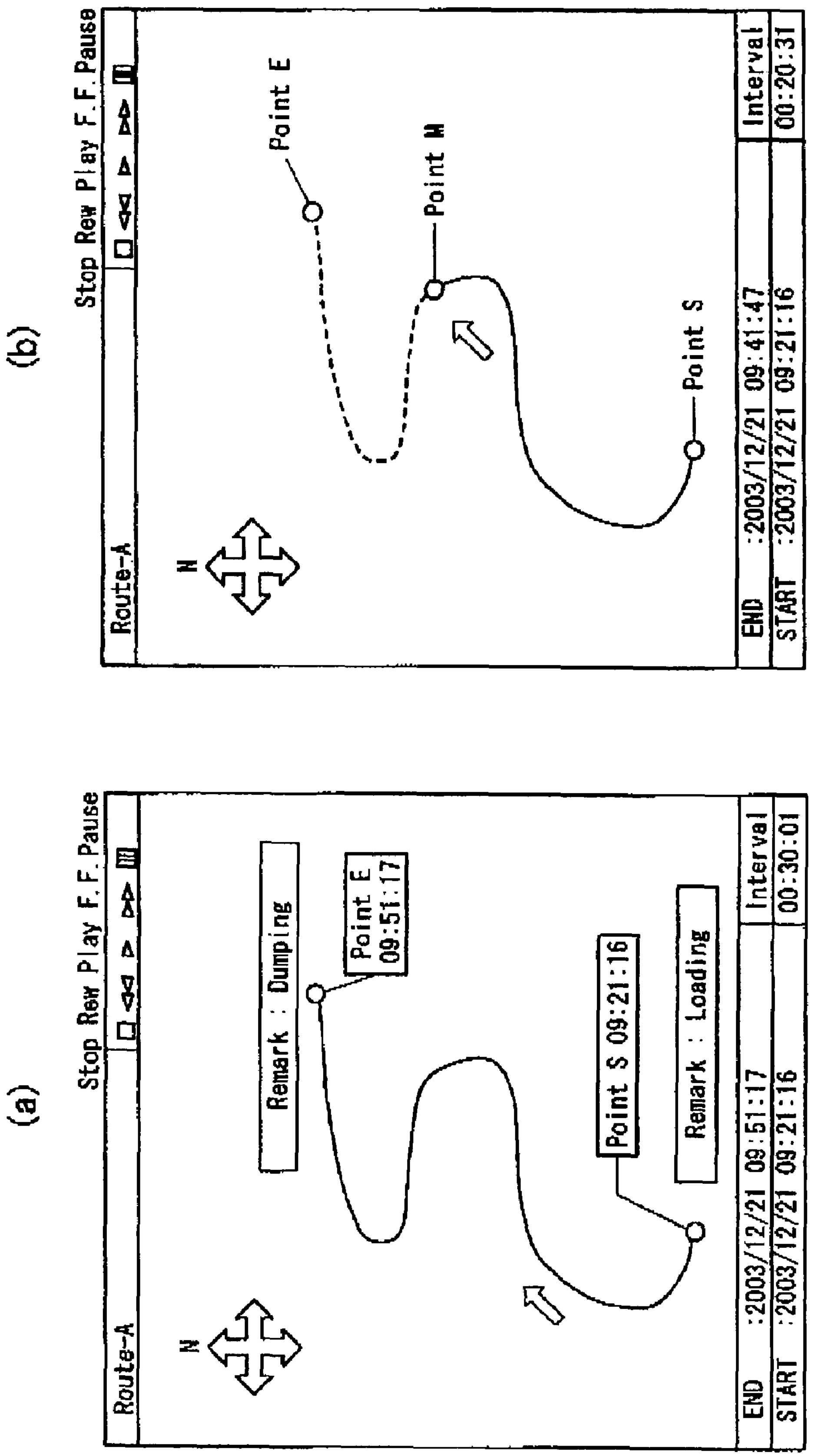
FIG. 6 shows a screen of the monitor in which only the route A desired to be analyzed is extracted from the three routes A, B and C shown in FIG. 5, and (b) shows a screen of the monitor in a state where it is halted at an intermediate position (point M), which an analyzer wishes to analyze, on the track of the route A laid between the point S and the point E by means of the player function.

FIG. 6(*a*) shows only a route A desired to be analyzed among the three routes A, B and C shown in FIG. 5, and FIG. 6(*b*) shows a screen of the monitor in a state where it is halted at an intermediate position (point M), which an analyzer wishes to analyze, on the track of the route A laid between the point S and the point E by means of the player function. In this case, it is assumed to analyze a track (route A) in which mined ores were loaded into the vehicle at the point S, the vehicle ran uphill and stopped at the Point E, the ores were unloaded from the vehicle at the point E, then the vehicle ran downhill and stopped at the point S.

Figure 7:
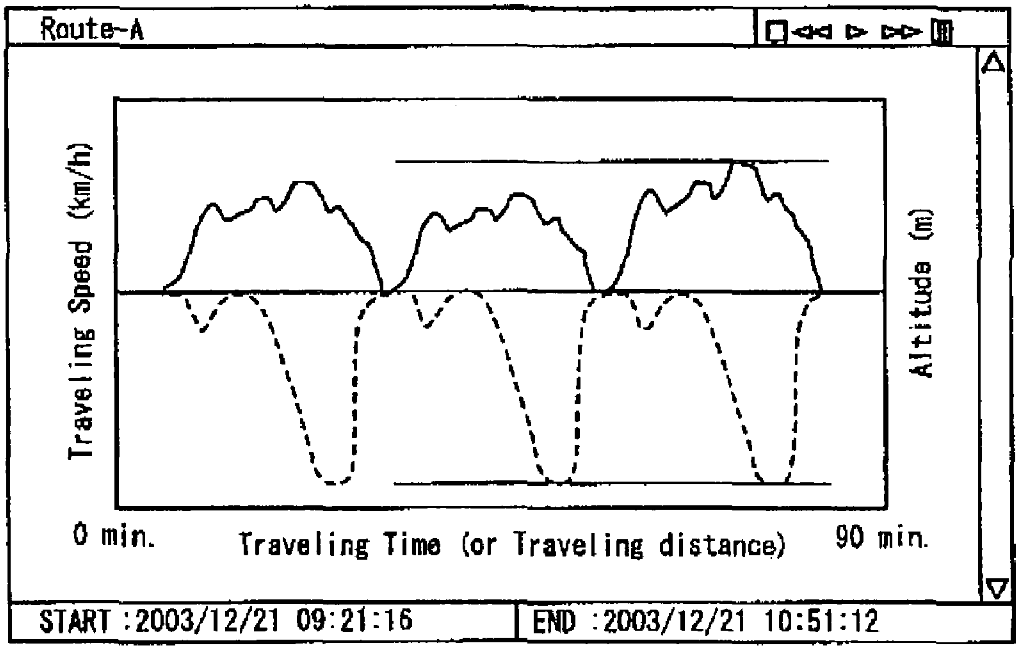
FIG. 7(*a*) is a graph showing an example of the result of the measurement while the construction vehicle V travels along the route A for three round trips with the traveling time being as abscissa axis, the traveling speed as the ordinate axis on the left hand side, and the level difference of a road surface as the ordinate axis on the right hand side.
Figure 7:
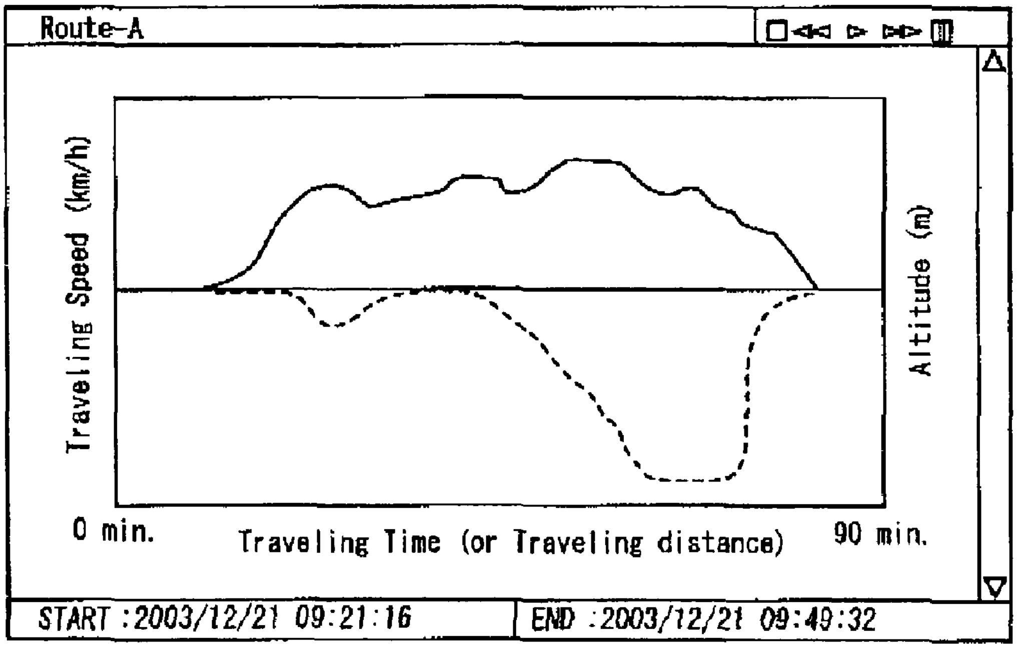

FIG. 7(*a*) is a graph showing an example of the result of the measurement while the construction vehicle V travels along the route A for three round trips with the traveling time being as abscissa axis (which may be alternatively displayed as in the traveling distance), the traveling speed as the ordinate axis on the left hand side, and the level difference of a road surface as the ordinate axis on the right hand side. The horizontal line in the figure can be moved with using a cursor function, and peak values of the data corresponding to each ordinate axis may be displayed when the horizontal line is matched with the peak of the graph. FIG. 7(*b*) is a graph visualizing only the data of one round trip of interest (first one round trip) out of the data of the three round trips shown in FIG. 7(*b*). It is noted that the cursor function may not be limited in the horizontal direction but it may also set in the vertical direction.

Figure 8:
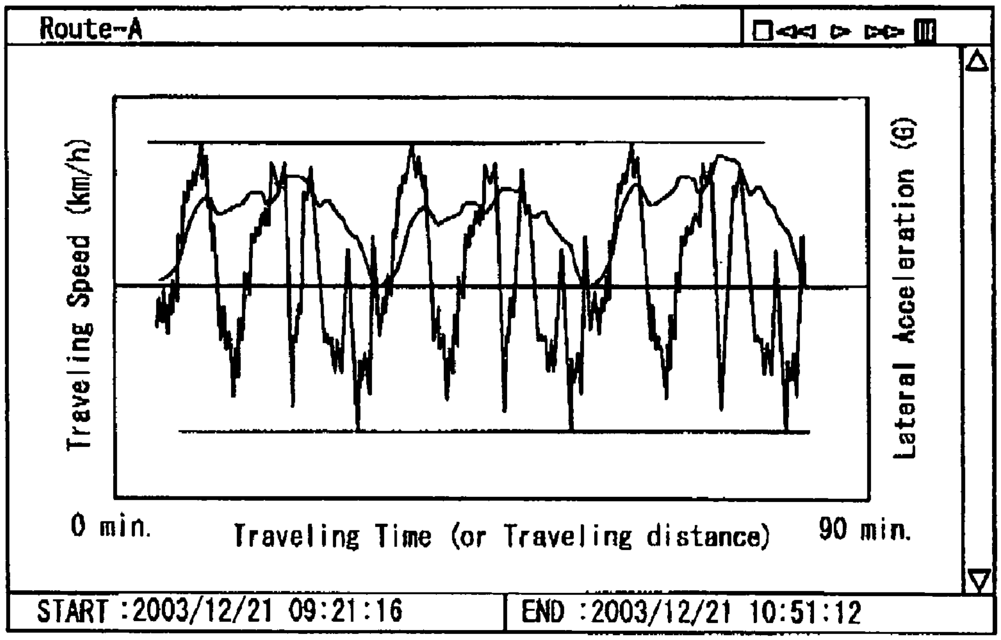
FIG. 8(*a*) is a graph showing an example of the result of the measurement while the construction vehicle travels along the route A for three round trips with the traveling time being as abscissa axis, and the traveling speed and lateral acceleration acting on the vehicle as the ordinate axis.
Figure 8:
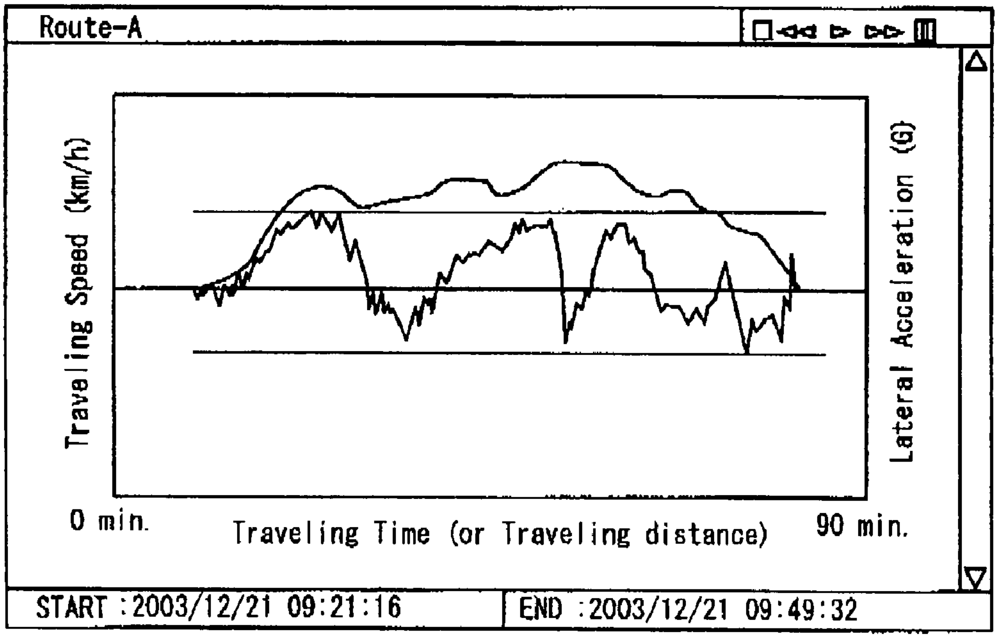

FIG. 8(*a*) is a graph showing an example of the result of the measurement while the construction vehicle travels along the route A for three round trips with the traveling time being as abscissa axis (which may be alternatively displayed as in the traveling distance), and the traveling speed and lateral acceleration (also referred to as lateral G) acting on the vehicle as the ordinate axis. The horizontal line in the figure can be moved with using a cursor function, and peak values of the data corresponding to each ordinate axis may be displayed when the horizontal line is matched with the peak of the graph. FIG. 8(*b*) is a graph visualizing only the data of one round trip of interest (first one round trip) out of the data of the three round trips shown in FIG. 8(*a*). This graph can be displayed simply by inputting (selecting) the start and end times of the block desired to be extracted. It is noted that the cursor function may not be limited in the horizontal direction but it may also set in the vertical direction.

Figure 9:
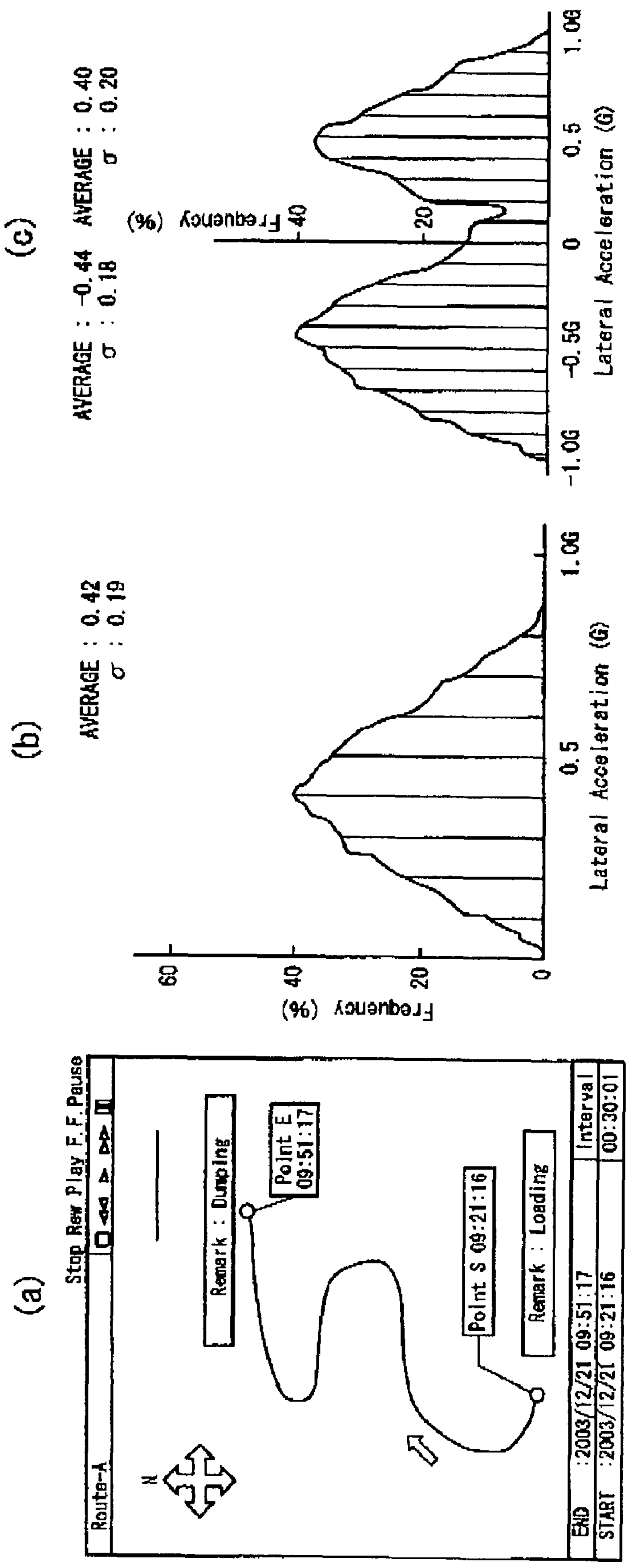
FIGS. 9(*a*), (*b*) and (*c*) show distributions of the frequencies of the acceleration in a specific running block desired to be analyzed.

FIGS. 9(*a*), (*b*) and (*c*) show distributions of the frequencies of the acceleration in a specific running block desired to be analyzed. FIG. 9(*a*) shows a track in the specific block (route A) in which the distribution of the frequencies is calculated. FIGS. 9(*b*) and 9(*a*) have an abscissa axis representing the lateral acceleration (G) and an ordinate axis representing the frequencies in the specific block, and FIG. 9(*b*) shows a case where the lateral acceleration (G) of the vehicle in the right-and-left direction is processed as an absolute value, and FIG. 9(*c*) shows a case where the acceleration (G) of the vehicle in the right-and-left direction is separately processed, and the result is shown with the lateral acceleration during a left-handed rotation (lateral acceleration in the right direction) being set as a positive value and the lateral acceleration during a right-handed rotation. (lateral acceleration in the left direction) being set as a negative value. While FIGS. 9(*b*) and (*c*) show a case where the abscissa axis represents the lateral acceleration (G), it is possible to select either of accelerations acting on the running vehicle in the back-and-forward and right-and-left directions to display the selected acceleration as the abscissa axis. It is preferred that the value of the acceleration in the up-and-down direction is set to be displayed with the acceleration of gravity being deducted.

In this way, once the distribution of frequencies of the acceleration, especially the distribution of frequencies of the lateral acceleration in the specified running block is known, the harshness of the tire using condition can be quantified by setting a threshold limit of the lateral acceleration (for example, 0.1 G) and counting the ratio (number) of the lateral acceleration exceeding the threshold limit.

An average gradient of the road surface between the two points extracted from the traveling track is calculated according to the following equation:

$$\text{Average Gradient}=H/sqrt(D^2-H^2)$$

where H represents a difference (m) in the altitude between the two points and D represents a three-dimensional distance (m) between the two points.

An average traveling speed between the two points extracted from the traveling track is calculated according to the following equation:

$$\text{Average Traveling Speed}=(60\times60\times D)/(1000\times t)$$

The cause of the tire trouble actually is quantitatively analyzed from various data obtained by the quantitative analysis method according to the present invention and one example thereof will be discussed in the followings.

The tire trouble is classified mainly into a trouble in the bead portion accompanying a deformation of the entire tire (case) and a trouble in the tread portion accompanying heat generation in the tread portion including the belt.

As factors affecting the trouble in the bead portion, a ration of loading force acting on the tire, acceleration in the up-and-down and back-and-force directions, and gradient of the road surface may be recited by way of example.

The term "ratio of loading force acting on the tire" as used herein means an actual load acting on one construction tire to be run is divided by the maximum loading force (maximum load) specified in TRA, JATMA YEAR BOOK. The larger the ratio of loading force acting on the tire is, the larger the deformation of the bead portion is, so that the trouble in the bead portion may be easily caused.

Among the accelerations acting on the tire in the up-and-down, back-and-forward and lateral (right-and-left) directions, the accelerations in the up-and-down and right-and-left directions act in a direction in which shear strain is caused between the bead portion of the tire and the rim, so that it seriously affects the trouble in the bead portion.

On the other hand, as factors affecting the trouble in the tread portion, heat generating factor of the tire and the acceleration (lateral G) acting on the tire in the lateral (right-and-left) direction may be typically recited by way of example.

The heat-generating factor of the tire is represented by a ratio of a transporting capacity measured while the tire is actually used (hereinafter referred to as "actual transporting capacity") to a transporting capacity which the tire itself possesses in theory (hereinafter referred to as "theoretical transporting capacity"). If the tire is used under a using condition in which the ratio is less than one, it means that the trouble in the tread portion arisen from the head generation is not caused in theory.

The actual transporting capacity can be calculated according to the following equation:

Average Loading Force of Tire (ton)=(Loading Force of Unloaded Tire+Loading Force of Loaded Tire)/2

Average Traveling Speed=(Transporting Distance on Round Trip (km))×(Number of Round Trip (times))/(Traveling Time (hour))

Actual Transporting Capacity=(Average Loading Force of Tire (ton))×(Average Traveling Speed (km/h))

The theoretical transporting capacity can be determined by conducting an indoor drum test or an outdoor actual vehicle test with the critical heating temperature of the tire being as a reference, and can be calculated according to the following equation:

Theoretical Transporting Capacity=Loading Force of Tire within Critical Heating Temperature of Tire (ton)×Maximum Traveling Speed (km/h)

The term "critical heating temperature of the tire" as used herein means specifically the temperature at which coating rubber separates from belt cords and which is determined by a type of the tire.

The acceleration acting on the tire in the lateral (right-and-left) direction, i.e. lateral acceleration create a extensive distortion at the tread portion, especially at the end portion of the belt and thus affects the trouble in the tread portion. The accelerations in the up-and-down and back-and-forward directions, however, have little effect on the trouble in the tread portion.

Figure 10:
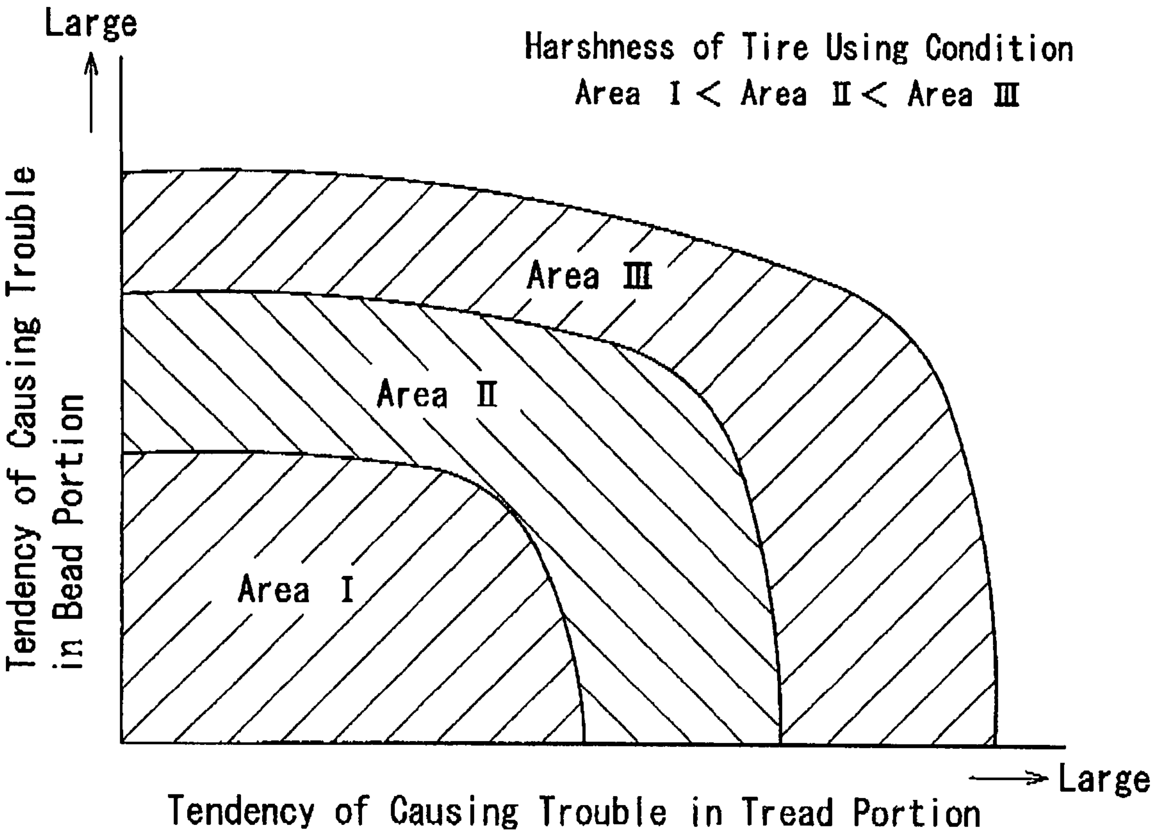
FIG. 10 is a concept diagram showing an example in which the harshness of the tire using condition is sectioned according to its level (in FIG. 10, sectioned by three regions).

FIG. 10 is drawn by quantitatively analyzing the data obtained from the quantitative analysis method according to the present invention. In this figure, harshness of the tire using condition is sectioned according to its level (in FIG. 10, sectioned by three regions) with the ordinate axis representing the tendency of causing the trouble in the bead portion while the abscissa axis representing the tendency of causing the trouble in the belt portion.

The tendency of causing the trouble in the bead portion is expressed in values calculated from the ratio of the loading force acting on the tire, the accelerations in the up-and-down and back-and-forward directions, and the gradient of the road surface. More specifically, the tendency can be calculated according to the following equation.

Taking a 240-ton truck (vehicle weight is 120 ton) as an example, it is assumed for the tire mounted on the truck that a tire size is 4000R57, tire maximum load capacity (maximum allowable load) W (Std) is 60.0 ton, tire load W (grad) at 5% gradient (the vehicle is loaded and on uphill gradient) is 60.7 ton, frequencies Gverf(0.1) of acceleration in the up-and-down direction not less than 1.0 G is 6.2% and frequencies Glonf(0.1) of acceleration in the back-and-forward direction not less than 0.1 G is 10.2%. An index Y (Index) representing the tendency of causing the trouble in the bead portion is calculated according to the following equation. The larger the index Y (index) is, the greater the tendency of causing the trouble in the bead portion.

$$\begin{aligned} Y(Index) &= \{(W(grad))/(W(Std))\}\times(1+Gverf(0.1))\times(1+Glonf(0.1)) \\ &= (66.7)/60.0)\times 1.062\times 1.102 \\ &= 1.301 \end{aligned}$$

The tendency of causing the trouble in the tread portion is expressed in values calculated from the heat factor of the tire and the accelerations in the lateral (right-and-left) direction. More specifically, the tendency can be calculated according to the following equation.

Taking a 240-ton truck (vehicle weight is 120 ton) as an example, it is assumed for the tire mounted on the truck that a tire size is 4000R57, theoretical transporting capacity TKPH(Nominal) is 940, actual transporting capacity TKPH (Operation) is 1105, and frequencies Glatf(0.1) of acceleration in the lateral (right-and-left) direction not less than 0.1 G is 8.3%. An index X (Index) representing the tendency of causing the trouble in the tread portion is calculated according to the following equation. The larger the index X (Index) is, the greater the tendency of causing the trouble in the bead portion.

$$\begin{aligned} X(Index) &= \{(TKPH(\text{Operating}))/(TKPH(\text{Nominal}))\}\times \\ &\quad (1+Glatf(0.1))\times(1+Glonf(0.1)) \\ &= (1105/940)\times 1.083 \\ &= 1.273 \end{aligned}$$

In this way, by drawing FIG. 10, it is possible to quantitatively analyze whether tire trouble is caused by the tire itself or by harshness of a tire using condition.

The above description shows only a part of possible embodiments of the present invention. These configurations can be mutually combined and various modifications can be made without departing from the scope of the present invention.

INDUSTRIAL APPLICABILITY

According to the present invention, it is possible to provide a system and method for quantitative analysis of a cause of tire trouble capable of quantitatively analyzing whether the tire trouble is caused by the tire itself or in a matter of harshness of a tire using condition in light of not only a force acting on a tire mounted on a running vehicle but also harshness of a tire using condition such as a traveling speed of the vehicle, level difference of a road surface, a curve and gradient information.

In addition, the system and method for quantitative analysis according to the present invention can also quantitatively analyze tire trouble by running the vehicle under a tire using condition which is actually applied or is desired to be applied in the future by a user. The present invention, thus, has such an effect that a tire having a configuration tolerant of harshness of the tire using condition can be developed on the basis of the result of the quantitative analysis, so that a tire suitable for the tire using condition which is actually applied by a user can be provided to the user.

The invention claimed is:

1. A system for quantitative analysis of a cause of tire trouble, comprising a positional data receiving means for receiving positional data of a running vehicle from the GPS, an acceleration measuring means for measuring triaxial accelerations which are accelerations acting on the running vehicle in back-and-forward, right-and left and up-and-down directions while time synchronizing with the positional data received by the positional data receiving means, a database portion for storing the positional data received by the positional information receiving means and the triaxial acceleration data measured by the acceleration measuring means, a data analyzing means for quantitatively analyzing harshness of a tire using condition, and a display means for displaying an analysis result from the data analyzing means.

2. The system for quantitative analysis of a cause of tire trouble according to claim 1, wherein the positional data is planar positional data in light of only a horizontal plane.

3. The system for quantitative analysis of a cause of tire trouble according to claim 1, wherein the positional data is stereoscopic positional data in light of both horizontal and vertical directions.

4. The system for quantitative analysis of a cause of tire trouble according to claim 3, wherein the data analysis means calculates a traveling speed of the vehicle, level difference of a road surface and gradient information from the stereoscopic positional data.

5. The system for quantitative analysis of a cause of tire trouble according to claim 1, wherein the data analysis means calculates a frequent distribution of acceleration in an arbitrarily selected traveling block of the vehicle from the obtained triaxial acceleration data.

6. The system for quantitative analysis of a cause of tire trouble according to claim 1, wherein the quantitative analysis system has a player function capable of displaying the data wanted to be displayed among the obtained data with arbitrarily selecting a desired traveling block from all of the traveling track of the vehicle.

7. A method for quantitative analysis of a cause of tire trouble, comprising the steps of receiving positional data of a running vehicle from the GPS, simultaneously measuring triaxial accelerations which are accelerations acting on the running vehicle in back-and-forward, right-and-left and up-and-down directions while time synchronizing with the received data, quantitatively analyzing harshness of a tire using condition from the received positional data and the triaxial acceleration data, and displaying an analysis result.

8. The method for quantitative analysis of a cause of tire trouble according to claim 7, wherein the positional data is planar positional data in light of a horizontal plane only.

9. The method for quantitative analysis of a cause of tire trouble according to claim 7, wherein the positional data is stereoscopic positional data in light of both horizontal and vertical directions.

10. The method for quantitative analysis of a cause of tire trouble according to claim 9, wherein the method calculates a traveling speed of the vehicle, level difference of a road surface and gradient information from the stereoscopic positional data.

11. The method for quantitative analysis of a cause of tire trouble according to claim 7, wherein the method calculates a frequent distribution of acceleration in an arbitrarily selected traveling block of the vehicle from the obtained triaxial acceleration data.

12. The method for quantitative analysis of a cause of tire trouble according to claim 7, wherein the method has a player function capable of displaying the data wanted to be displayed among the obtained data with arbitrarily selecting a desired traveling block from all of the traveling track of the vehicle.

13. The method for quantitative analysis of a cause of tire trouble according to claim 7, wherein the harshness of the tire using condition is quantitatively analyzed by using a value obtained by summing tendencies of causing a trouble in a bead portion and a trouble in a belt portion.

14. The method for quantitative analysis of a cause of tire trouble according to claim 13, wherein the tendency of causing a trouble in a bead portion is calculated from values of a ratio of loading force acting on the tire, acceleration in the up-and-down and back-and-force directions, and gradient of the road surface.

15. The method for quantitative analysis of a cause of tire trouble according to claim 13, wherein the tendency of causing a trouble in a tread portion is preferably calculated from values of a heat factor of the tire and acceleration in the lateral direction acting on the tire.

* * * * *